Figure 1:
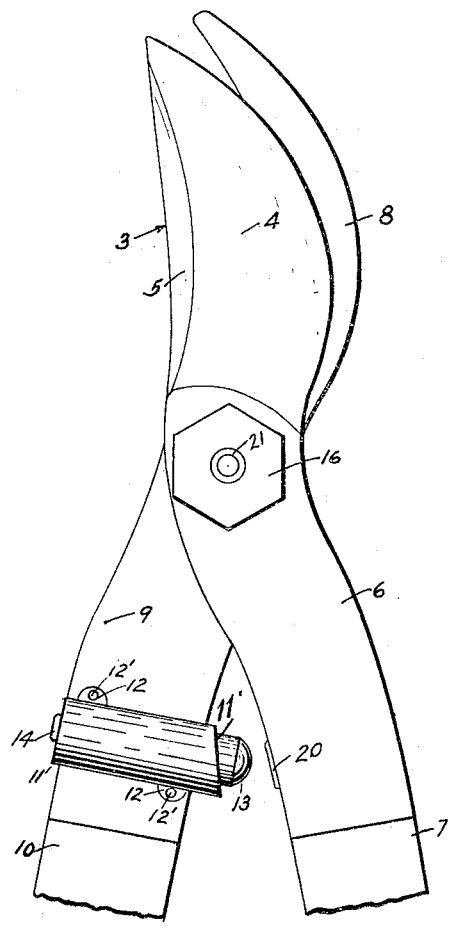

Sept. 8, 1931.　　　G. F. HICKOK　　　1,822,591

SHOCK ABSORBER AND STOP FOR PRUNING SHEAR HANDLES

Filed April 21, 1930

*INVENTOR.*
GEORGE F. HICKOK.
*ATTORNEY.*

Patented Sept. 8, 1931

1,822,591

UNITED STATES PATENT OFFICE

GEORGE F. HICKOK, OF BURLINGAME, CALIFORNIA

SHOCK ABSORBER AND STOP FOR PRUNING SHEAR HANDLES

Application filed April 21, 1930. Serial No. 445,907.

The present invention relates to improvements in combination shock absorbers and stops for shears, and more particularly to those shock absorbers and stops applied to the handles of pruning shears.

As is very well known to orchardists and those engaged in tree pruning, the continuous and heavy shocks imparted directly to and absorbed by the hand, arm, and shoulder muscles of those engaged in pruning are of such a severe character as to cause these muscles to become, in a measure, paralyzed, with much swelling and soreness of the muscles, often of so severe a nature as to necessitate a complete rest from work for a period of days.

The object of the invention, primarily, is to provide a combined shock absorber and stop of the character designated adapted to lessen or absorb entirely the shock imparted to the handles of pruning shears immediately following the passage of the shears through twigs, small limbs, and such other matter as is being pruned.

An additional object of the invention is to provide a simple, cheap and efficient combination shock absorber and stop for pruning shears for lessening the shock imparted by the handles immediately following the completion of the shearing act, and a stop adapted to arrest the travel of the handles toward each other soon thereafter.

My device comprises a casing having a bore and provided with flanges bearing openings to afford means for securing it to one of the metallic hafts bearing the wooden extensions, the casing having its inwardly extending extremity bevelled to accommodate the inward arcuate swing of the other of the metallic hafts. The bore of the device is provided with a plunger having its inward extremity tapped and threaded to accommodate a small threaded member adapted to enter therein serving as a piston rod and carrying a compression spring, the urge of which serves to thrust forcibly and outwardly said plunger. The other extremity of the piston rod extends slidably through and beyond a small bore in the base of the casing and terminates in an enlarged head bearing a slot, or kerf, serving as a means for screwing this threaded end of the rod into the threaded opening borne by the plunger.

Figure 2:
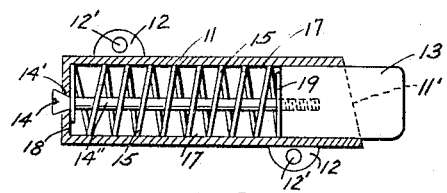

In the accompanying one sheet of drawings, forming a part of this specification and in which similar reference characters denote like parts, throughout:

Figure 1 is a perspective view of the combination shock absorber and stop, shown as mounted and secured in position upon one of the metallic hafts, the wooden extensions of the shearing device being partly broken away; and Figure 2 is an enlarged longitudinal sectional view of the casing of the device, showing the bore thereof, the plunger therein, the piston rod as connected therewith, the piston rod extension beyond the base of said casing, the kerfed head thereof, and the compression spring as borne by the piston rod within the bore of said casing.

Referring more particularly to the drawings, the numeral 3 indicates, in a general way, a pair of pruning shears, having handles, as indicated at 7 and 10. The shears proper comprise the blade 4 provided with a beveled face 5, a fork 8, a pintle 16, shear arms, or hafts, 6 and 9, and blade and fork openings 21.

The shock absorbed comprises a hollow cylindrical casing 11 provided with a central opening 14′, the bore 17 of which carries a plunger 13 with its base 19 resting upon a compressible spring 15 and provided with a piston rod 14″ extending centrally in the bore 17 and through the central base opening 14′ of the base 18 and beyond and ending in a head bearing a kerf, or slot, 14, affording means through which the plunger 13 may be adjusted relative to the abutting face 20 borne by the arm 6, the said cylindrical body 17 being further supplied with lugs 12 bearing openings 12′, affording a means wherethrough the absorber may be secured to the shear arm 9.

The inner end 11′ of the casing 11 is open so that the plunger 13 may project therethrough, the end wall being bevelled and at an angle to the haft thus providing a stop for the other haft.

Having thus described my invention, I claim, and desire to secure by Letters Patent of the United States the following:

1. An attachment for a pair of shears comprising a casing adapted to be secured to the inner face of one of the hafts of the shears, one end of said casing being open, a plunger slidably mounted in said casing and extending through the open end thereof, a spring positioned in said casing between said plunger and the opposite end of the casing, means for adjusting the plunger with respect to the casing, said means comprising a rod adjustably connected to said plunger, said rod extending through said opposite end of the casing, said rod being provided with means whereby it may be rotated to adjust the position of said plunger.

2. A combined shock absorber and stop for a pair of shears comprising a casing adapted to be secured to one of the hafts of the shears, one end of said casing being open, a plunger slidably mounted in said casing and extending through the open end thereof, a spring in said casing urging the plunger to its outward position, and means for drawing said plunger into said casing, said means comprising a rod threadedly connected to said plunger, said rod extending through the opposite end of said casing, said casing being provided with means for securing it to said haft with its open end projecting beyond said haft and at an angle thereto to provide a stop for the other haft.

In testimony whereof I hereunto affix my signature.

GEORGE F. HICKOK.